United States Patent
Maguire et al.

(10) Patent No.: US 9,815,036 B2
(45) Date of Patent: Nov. 14, 2017

(54) LIQUID COLOR CART AND METHOD FOR LIQUID COLOR DISPENSING

(71) Applicants: Stephen B. Maguire, West Chester, PA (US); Paul S. Maguire, Thornton, PA (US)

(72) Inventors: Stephen B. Maguire, West Chester, PA (US); Paul S. Maguire, Thornton, PA (US)

(73) Assignee: Maguire Productss, Inc., Aston, PA (US)

( * ) Notice: Subject to any disclaimer, the term of this patent is extended or adjusted under 35 U.S.C. 154(b) by 76 days.

(21) Appl. No.: 14/458,681

(22) Filed: Aug. 13, 2014

(65) Prior Publication Data
US 2015/0231583 A1    Aug. 20, 2015

Related U.S. Application Data

(60) Provisional application No. 61/942,135, filed on Feb. 20, 2014.

(51) Int. Cl.
| | |
|---|---|
| *G01G 21/22* | (2006.01) |
| *G01G 19/24* | (2006.01) |
| *G01G 17/04* | (2006.01) |
| *B01F 13/10* | (2006.01) |
| *B01F 15/04* | (2006.01) |
| *B01F 15/00* | (2006.01) |

(52) U.S. Cl.
CPC .... *B01F 13/1066* (2013.01); *B01F 15/00194* (2013.01); *B01F 15/00428* (2013.01); *B01F 15/0445* (2013.01); *G01G 19/24* (2013.01); *G01G 21/22* (2013.01); *G01G 17/04* (2013.01)

(58) Field of Classification Search
CPC ............ B01F 13/1066; B01F 15/00428; B01F 15/0445; B01F 2215/005; B01F 15/00194; G01G 17/04; G01G 19/24; G01G 21/22
See application file for complete search history.

(56) References Cited

U.S. PATENT DOCUMENTS

| | | | | |
|---|---|---|---|---|
| 1,528,899 | A * | 3/1925 | Thomas | G01G 19/00 177/126 |
| 3,035,650 | A * | 5/1962 | Friedl | B66F 17/003 177/141 |
| 3,472,329 | A * | 10/1969 | Smith | G01G 3/1408 177/132 |
| 3,596,725 | A * | 8/1971 | Homs | G01G 23/00 177/126 |
| 4,002,215 | A * | 1/1977 | Harvill | G01F 23/20 177/126 |
| 4,533,009 | A * | 8/1985 | Evans | G01G 19/083 177/139 |
| 4,741,659 | A * | 5/1988 | Berg | B62B 1/264 294/90 |

(Continued)

*Primary Examiner* — Tony G Soohoo
(74) *Attorney, Agent, or Firm* — Fox Rothschild LLP (57) ABSTRACT

A portable scale for weighing containers, and includes a weighing tray that may be moved from a weighing position to a non-weighing position by a drive mechanism. When in the non-weighing position, the weighing tray is low to the ground, allowing for easy loading and unloading. When in the weighing position, force is transmitted to one or more load cells located between the weighing tray and a scale assembly, which allows for an accurate measurement of the container and/or its contents.

5 Claims, 6 Drawing Sheets (56) References Cited

U.S. PATENT DOCUMENTS

| | | | | | |
|---|---|---|---|---|---|
| 4,921,385 | A | * | 5/1990 | Okuno | B66F 9/20 187/231 |
| 5,122,027 | A | * | 6/1992 | Tabayashi | B62B 3/104 414/454 |
| 5,417,536 | A | * | 5/1995 | Cech | G01G 19/083 177/140 |
| 5,427,494 | A | * | 6/1995 | Fitzgerald | B62B 3/104 212/343 |
| 5,482,421 | A | * | 1/1996 | Cummins | G01G 19/12 177/140 |
| 5,639,197 | A | * | 6/1997 | Cummins | B62B 3/104 294/67.33 |
| 5,944,474 | A | * | 8/1999 | Cummins | B62B 3/104 294/119.2 |
| 5,990,423 | A | * | 11/1999 | Ashpes | G01G 23/3728 177/140 |
| 6,222,137 | B1 | * | 4/2001 | Handford | G01G 19/083 177/126 |
| 7,045,721 | B1 | * | 5/2006 | Green | B65B 43/52 141/83 |
| 2008/0224433 | A1 | * | 9/2008 | Setzer | B62B 1/10 280/47.131 |
| 2012/0241228 | A1 | * | 9/2012 | Prus | G01G 5/006 177/244 |
| 2014/0245809 | A1 | * | 9/2014 | Muelich | G01G 21/26 73/1.13 |
| 2015/0168207 | A1 | * | 6/2015 | Pollock | G01G 19/387 177/1 |
| 2015/0231583 | A1 | * | 8/2015 | Maguire | G01G 19/24 366/141 |
| 2015/0233756 | A1 | * | 8/2015 | Maguire | F04B 19/22 222/56 |
| 2016/0195423 | A1 | * | 7/2016 | Cassoni | G01G 15/00 177/1 |

* cited by examiner

LIQUID COLOR CART AND METHOD FOR LIQUID COLOR DISPENSING

CROSS-REFERENCE TO RELATED PATENT APPLICATION

This patent application claims the benefit of the priority under 35 USC 120 of provisional U.S. patent application Ser. No. 61/942,135 filed 20 Feb. 2014 in the name of Stephen B. Maguire and entitled "Liquid Color Cart and Method for Liquid Color Dispensing." The disclosure of the '135 application is hereby incorporated by reference in its entirety.

BACKGROUND OF THE INVENTION

Field of the Invention

The present invention relates generally to floor scales, and more specifically electronic floor scales for weighing drums, cylinders and other such containers.

Description of the Prior Art

Generally, scales used in industry for weighing containers are designed to be placed in a fixed location and the containers to be weighed must be brought to the scale. This is a drawback in many industrial settings where stock may be spread out over a large area of the facility and the containers are heavy and cumbersome to move.

Another disadvantage of existing scales, including portable scales, is that the weighing surface of the cart is supported by a substantial substructure, causing the weighing surface to be elevated some inches above the ground, forcing the user to lift the heavy container off of the floor in order to place it onto the scale.

SUMMARY OF THE INVENTION

In one of its aspects, the present invention provides a cart that can both weigh and transport large containers of material. In a certain embodiment, the cart may include a weighing tray, a scale assembly substantially supporting the weighing tray, and at least one weight sensor mounted between the weighing tray and the scale assembly, so that weight measured by each weight sensor can used to derive the weight of a product located on the weighing tray. The scale assembly includes a plurality of ground-contacting members. In a certain embodiment, these ground-contacting members are wheels.

The weight sensor of the cart may be a load cell. With that configuration, the cart may also include a device adapted to convert a signal from the load cell into a weight.

In a certain embodiment, the scale assembly of the cart includes at least one drive mechanism that is coupled to the weighing tray. The drive mechanism is configured to elevate the weighing tray. In a certain embodiment, the drive mechanism includes at least one pneumatic cylinder.

In another aspect, this invention provides a method of providing liquid color to be used in a plastic resin processing machine to fabricate finished or semi-finished plastic parts of a prescribed color. The method includes the steps of: (a) providing a color recipe specifying weights of component colors to be blended to create a required color for fabricated parts to be of the prescribed color; (b) continuously sensing weight of a container; (c) sequentially adding each component color to the container until sensed increase in container weight equals the weight of the component color required by the recipe; (d) repeating step "c" until all of the component colors required by the recipe have been added; and (e) blending the component colors in the container.

In a certain embodiment of the present invention, the recited step of continuously sensing weight of the container is performed by a load cell. The component colors added to the container may be single pigment dispersions.

DESCRIPTION OF THE PREFERRED EMBODIMENTS AND BEST MODE KNOWN FOR PRACTICE OF THE INVENTION

Liquid color, when manufactured, is the result of blending a number of different base pigments together to obtain the exact color and shade of color a customer wants. The accurate addition of each component is critical. Generally it is necessary to measure and dispense each component to an accuracy of 1 part per 1000, which is $\frac{1}{10}$ of 1.0% of the total blend weight.

The components are generally mixed in a large container, such as a drum or barrel. The empty drum to be filled with liquid color may be a 30 gallon drum that can hold from 300 to 400 pounds, depending on bulk density of the blend. Once filled, the container is then transported to a desired location through the use of a cart or other transport device. This generally requires the now 300 to 400 pound container to be manually lifted onto the cart, which can prove onerous.

The invention provides a cart that is able to measure the components being added to the drum while the drum is loaded on the cart. This allows one to skip the step of having to load a heavy drum on to the cart after it has been filled. Further, the invention allows one to determine the amount of liquid color in the drum without having to transport the drum to a scale, remove the drum from the cart, and place the drum on the scale. As explained in more detail below, this is helpful in determining and correcting any loss-in-weight of the liquid color.

The mechanical design of a cart 10 is illustrated in FIGS. 1-7. The cart 10 includes a generally rectangular base portion 16, scale assemblies 18, and a weighing tray 14. The scale assemblies 18 project from upwardly opposing lateral sides of the base 16. In the illustrated embodiment, the scale assemblies 18 each include a shelf 26, two pneumatic cylinders 20, two pistons 22, and piston couplings 24 that attach each piston 22 to the base 16.

Referring to FIGS. 3, 4, 5, and 6, the base portion 16 includes lateral frame members 38 on each side, and a rear frame member 40, with the front side of the base portion 16 open to allow for easy loading and unloading of a drum 100 or other container on the weighing tray 14. Two rear wheel support members 42 extend downward from opposing lateral sides of the underside of the rear frame member 40. Front wheels 44 are attached to front ends of the lateral frame members 38 and rear wheels 46 are attached to the rear wheel support members 42.

A column 48 is affixed at its distal end to the rear frame member 40 by bolting or other detachable means and extends upwards. Handles 50 are attached to the proximal end of the column 48. A controller unit 52 is also affixed to the proximal end of the column 48 by means of a mounting bracket 56. The mounting bracket 56 includes an adjustable tray 58 that allows the display monitor 54 of the controller unit 52 to be angled so as to be visible to the user.

Figure 1:
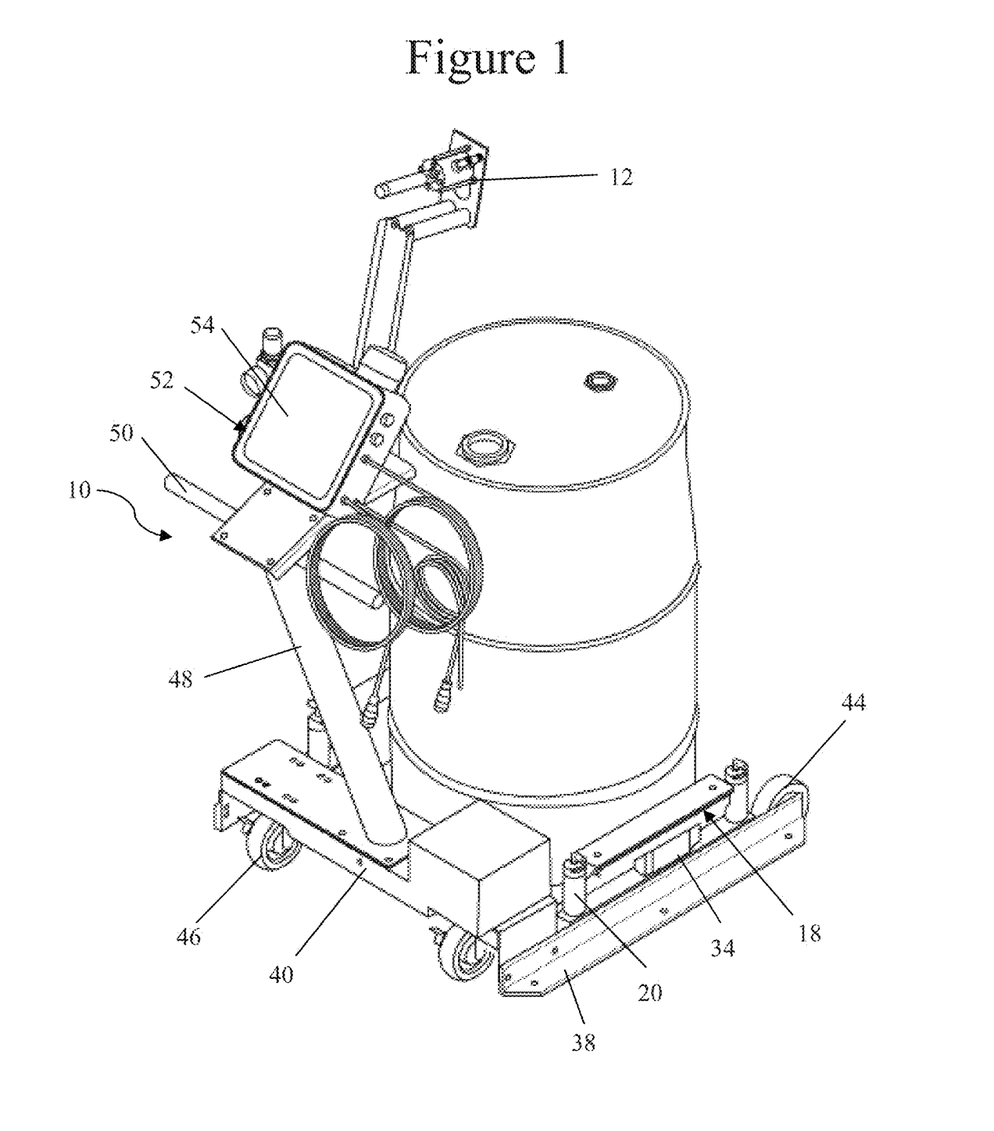
FIG. 1 is a perspective view of an embodiment of a cart of the present invention.
Figure 2:
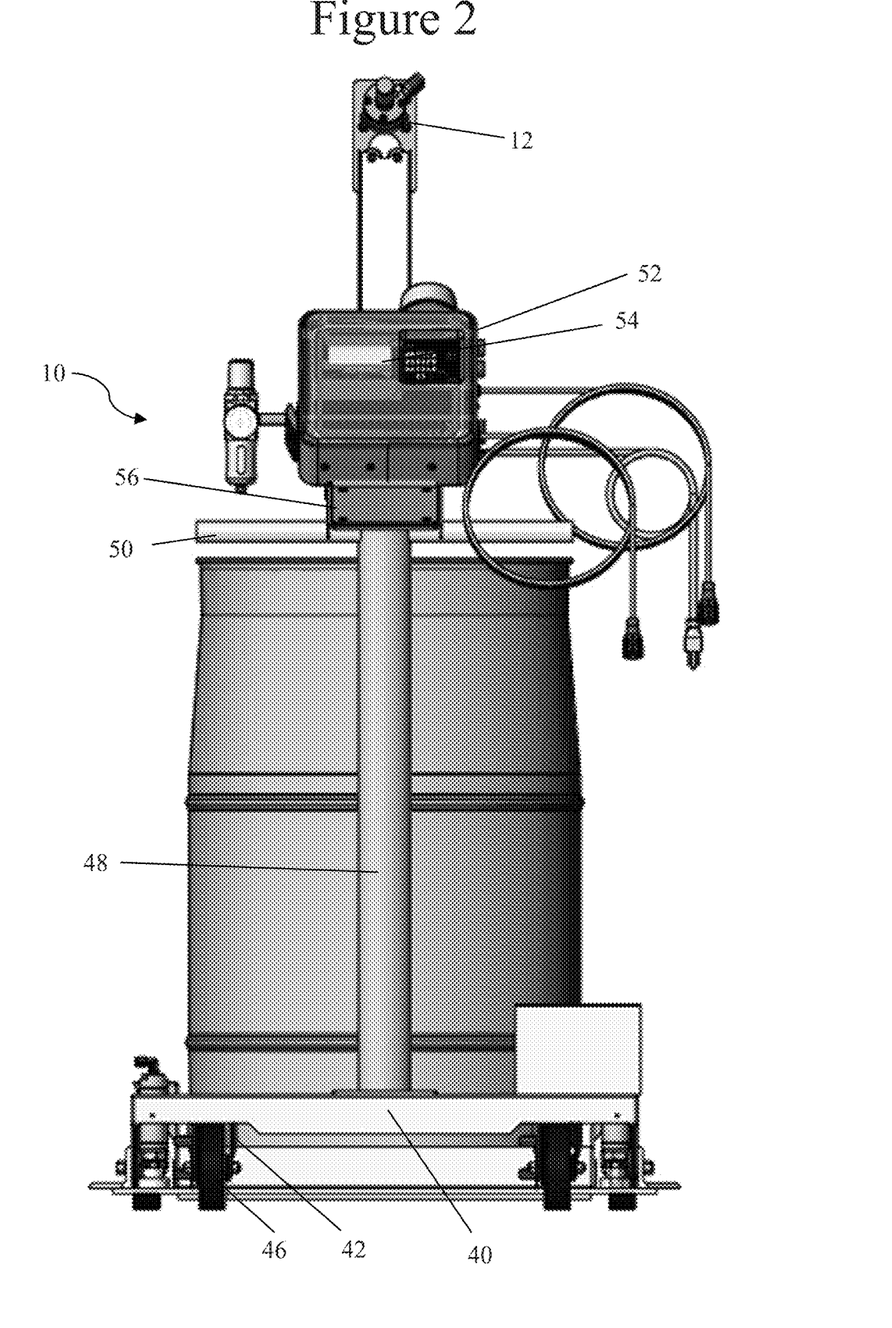
FIG. 2 is a view of the rear of the embodiment of the cart shown in FIG. 1.
Figure 3:
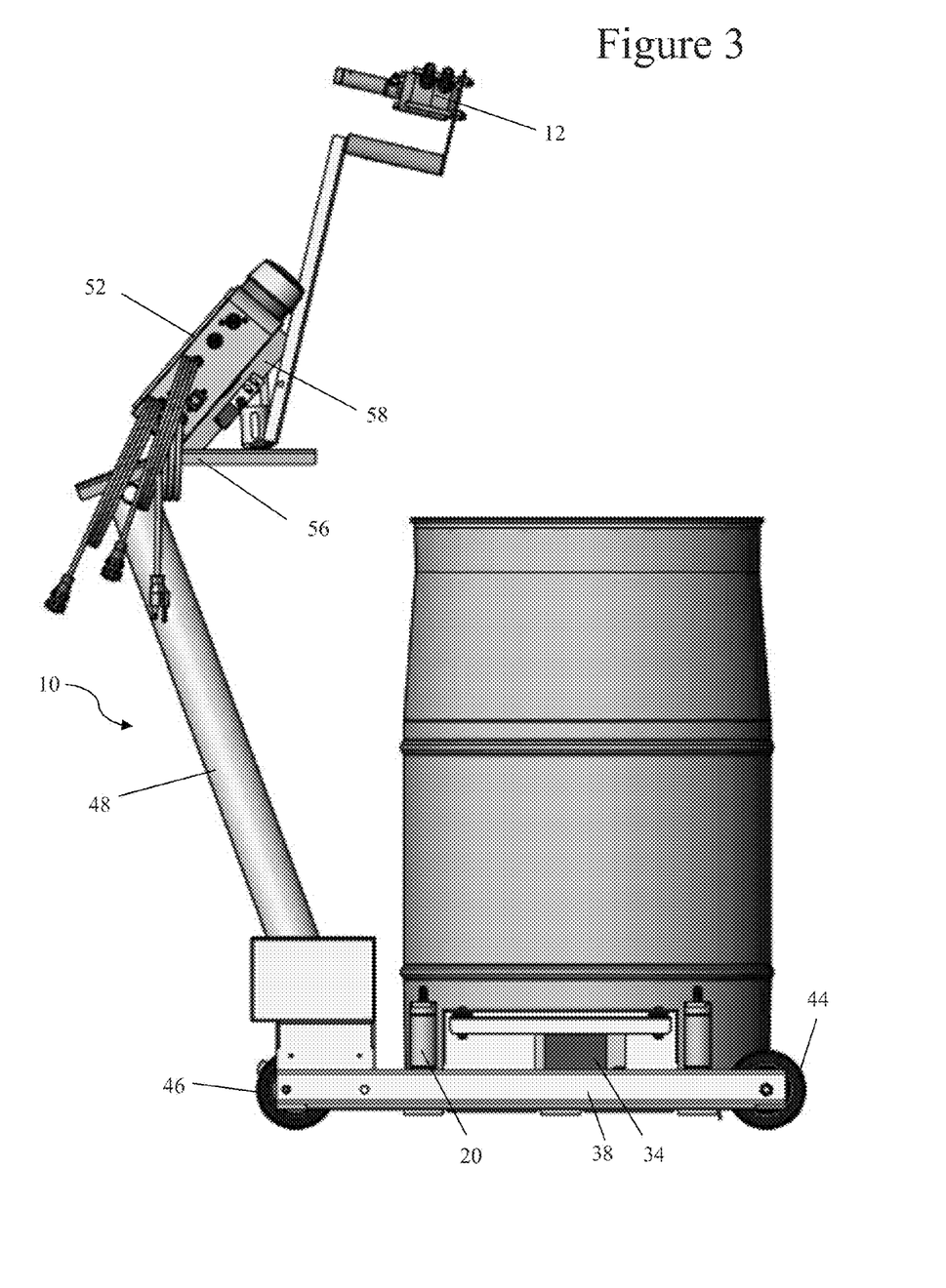
FIG. 3 is a side view of the embodiment of the cart shown in FIG. 1.
Figure 4:
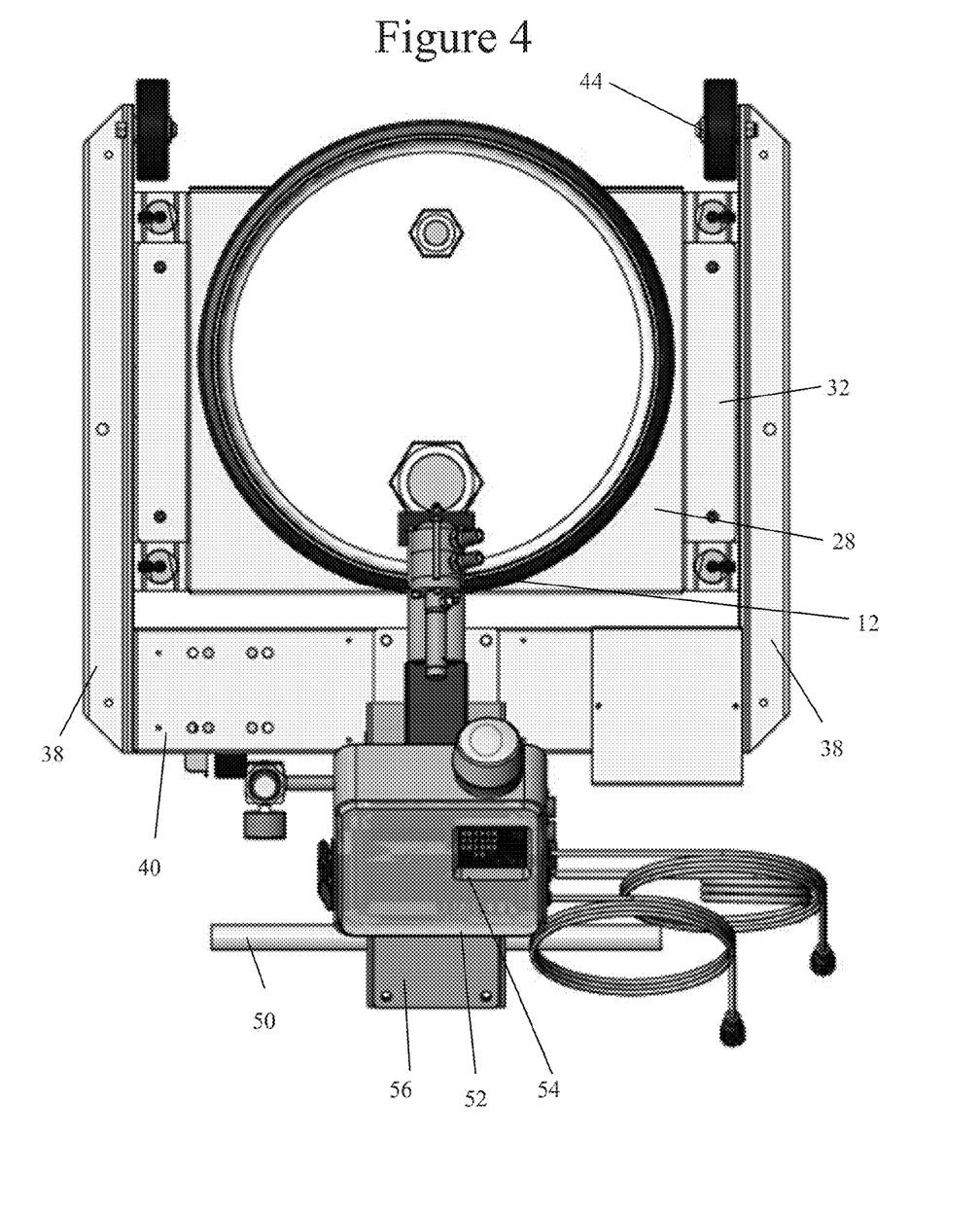
FIG. 4 is a top view of the embodiment of the cart shown in FIG. 1.
Figure 5:
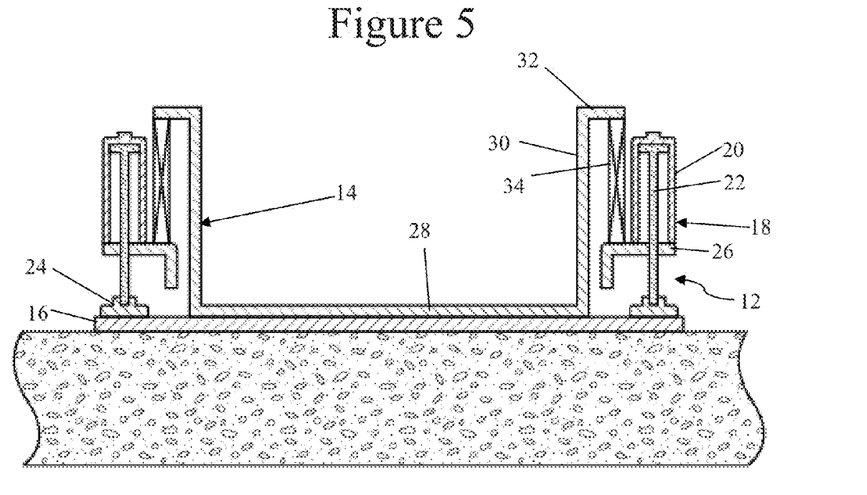
FIG. 5 is a cross-sectional view of the weighing tray and scale assembly portion of an embodiment of a cart of the invention in a non-weighing position.

As shown in FIG. 5 the weighing tray 14 is generally U-shaped, and includes a weighing tray base 28, two weighing tray arms 30, and projections 32 that laterally extends from the top of the weighing tray arms 30 generally parallel to the shelf 26 of the scale assembly. A weight sensor, depicted in the illustrated embodiment as a load cell 34, is positioned between the projections 32 and the shelf 26. The load cells 34 are electrically coupled to a controller unit 52 by a plurality of insulated wires that run under the lateral frame members 38 and the rear frame member, and inside of column 48. Load cells 34 are located on either side of weighing tray 14; one load cell 34 is shown in detail in FIG. 7.

Figure 6:
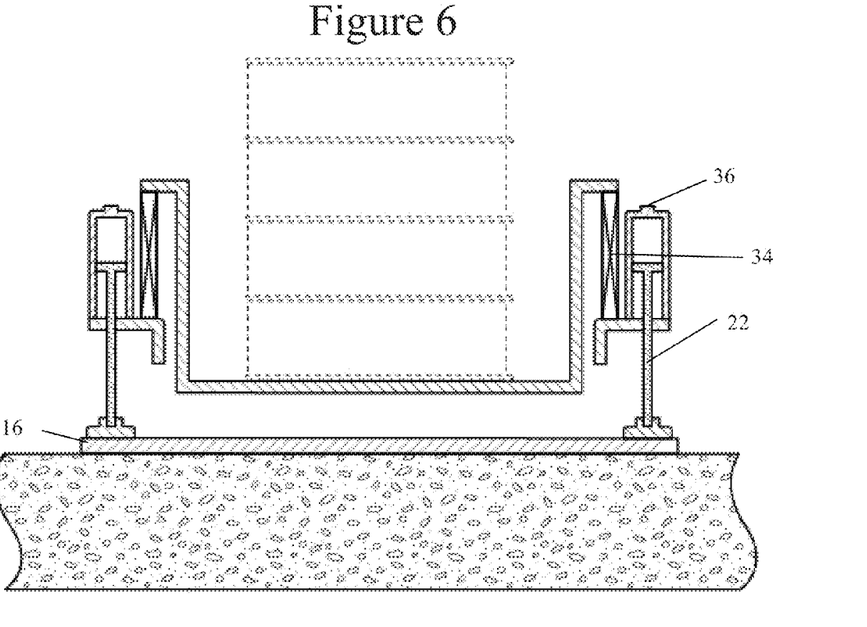
FIG. 6 is a cross-sectional view of the weighing tray and scale assembly portion of an embodiment of a cart of the invention a weighing position.
Figure 7:
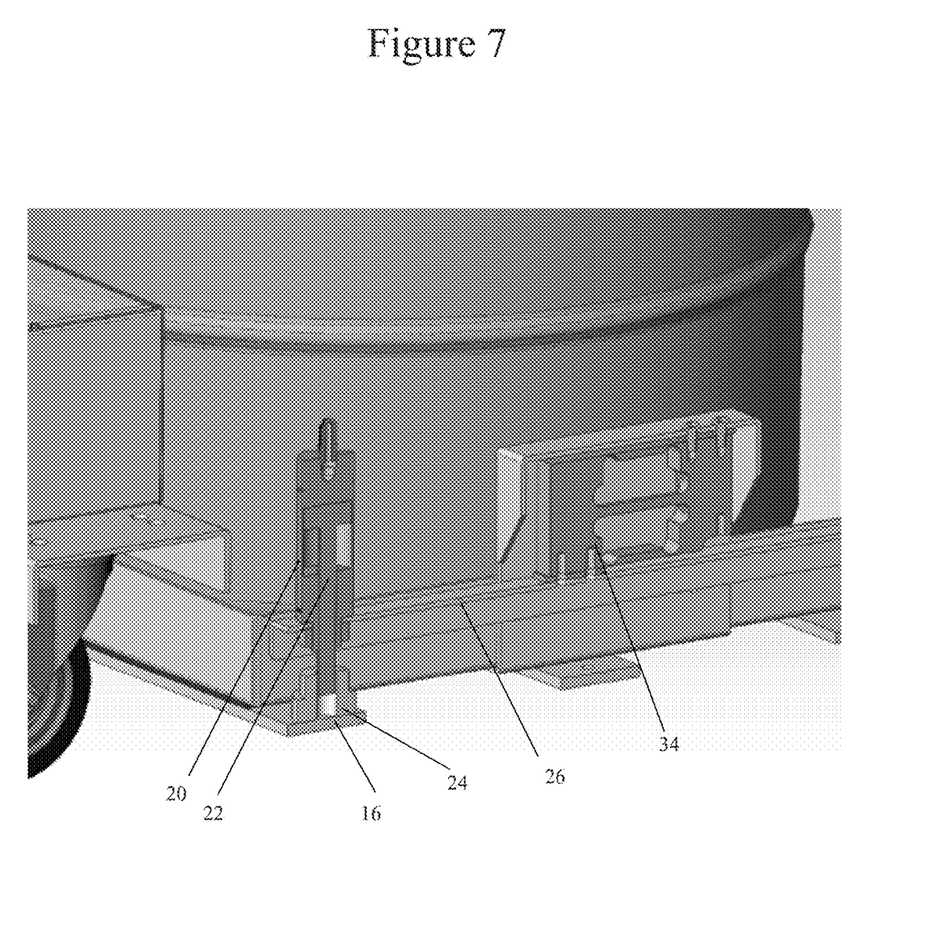
FIG. 7 is a broken isometric view of a lower right front portion of the cart shown in FIG. 1.

With particular reference to FIGS. 5, 6, and 7, the cart 10 may be used as follows. The scale assemblies 18 of the cart 10 allow the weighing tray 14 to be transitioned from a non-weighing position to a weighing position. FIG. 5 shows the weighing tray 14 in the non-weighing position, in which the weighing tray 14 is allowed to rest on the base portion 16. The weighing tray 14 preferably remains in the non-weighing position when moving the cart 10, or when placing a drum on the cart 10, or when removing drum 100 from the cart 10. This ensures that load cells 34 are completely free of any weight, and therefore are safe from being damaged during these activities. Additionally, load cells 34 are preferably positioned in such a way as to allow the cart weighing tray 14 horizontal surface to be very close to or rest on the floor. This allows a heavy drum to be moved onto the weighing tray 14 while tray 14 is in the non-weighing position by simply tilting drum 100 and sliding the cart 10 under the drum. One person can do this without special jacks or lifts.

FIG. 6 shows the weighing tray 14 in the weighing position. To transition to this position, air enters inlets 36 located at the tops of pneumatic cylinders 20, thereby pushing the cylinder 20 upwards in relation to the piston 22. Because the pneumatic cylinder 20 is mechanically coupled to the shelf 26, as the top of the cylinder 20 moves upward, the shelf 26 translates in the same direction. As the shelf 26 moves, it forces the upper portions of the load cells 34 upwards and consequently lifts the weighing tray base 28 off the base 16. With weighing tray 14, as well as the drum and its contents, no longer supported by base 16, a downward force results on the load cells 34, which allows the load cells to accurately measure the weight of the item located in the weighing tray. The load cells 34 generate weight signal information that is sent to, and then processed by, controller unit 52 for calculating the weight of the drum and/or its contents. The measured weight may be displayed on display monitor 54 and/or electronically recorded.

Accuracy in measuring the weight of the material in the drum is important. For example, for a 300 pound batch of the final liquid color product, it is necessary to measure and dispense into drum 100 each component to within three tenths (0.3) of a pound, or 135 grams. In an embodiment of the present invention, load cells 34 on cart 10 can detect accurately to within 5 grams. This is a tighter tolerance then is presently generally available in the industry. More common is $\frac{1}{5000}$ of full scale reading, or 36 grams for a 400 pound batch of final product. To obtain such accuracy, cart 10 preferably uses two 90 kg load cells, providing a 180 kg or 400 pound capacity.

Such accuracy is necessary in determining, as the drum is filled, exactly how much liquid color is going in. This is referred to herein as "Gain in Weight" or "GIW". Similarly, it is important to accurately detect exactly how much liquid color is being removed as the liquid color is pumped out of the drum. This measurement is referred to herein as herein as "Loss in Weight" or "LIW".

Respecting GIW, as noted above, liquid color, when manufactured, is the result of blending a number of different base pigments together to obtain the exact color and shade of color a customer wants. When using the invention, this manufacturing process proceeds by placing an empty drum on the cart 10, and filling drum 100 with liquid from source drums, each of which contains a single pigment dispersion. Each source drum is fitted with a pump, and the controller unit 52 preferably includes software written to control each pump in such a way as to assure exact amounts are metered from a source drum containing a liquid single pigment dispersion into the blended drum 100 sitting on the cart 10. Examples of such pumps can be found in U.S. Pat. No. 9,188,118, the disclosure of which is incorporated by reference in its entirety herein. During this process, the weighing tray 14 remains in the weighing position. As each liquid single pigment dispersion component is added to the drum, load cells 34 can provide a continuous reading of the exact weight that has been added. Once the specified weight of the first component is added, the single pigment dispersion component from the next source drum may be added. This process continues until the all of the desired components have been added in the preferred amounts. When all of the components have been added to the drum, it is sealed and tumbled to blend all the single pigment dispersion components into one perfect, fully blended color, ready for use to color molded or extruded plastic parts.

Regarding LIW, the inventive cart 10 is also used to monitor "usage" of finished liquid color product as the liquid color is consumed by the user's process. The cart 10 allows the user to meter exact amounts of liquid color into his process machine for every cycle the machine runs. For example, when molding a 500 gram part that requires 1% liquid, or 5 grams of liquid color per part, the process must accurately meter 5 grams of liquid color for every process machine cycle that produces one of the 500 gram parts. The cart 10 accomplishes this using a very accurate pump, which is designed to repeatedly meter the same amount every cycle. The controller unit 52 of the cart 10 proceeds to adjust that amount as needed by monitoring the readings of the load cells 34 that are part of cart 10 and determining how much weight of liquid color cart 10 is "losing", on average, with each cycle. While cart 10 cannot reliably detect what is used in one cycle or over a few cycles, over time cart 10 can very accurately determine an average color loss. Based on that average, cart 10 can make small adjustments to the pump to target the exact 5 grams per cycle required for successful manufacture of the 500 gram parts.

The preferred embodiment herein disclosed is not intended to be exhaustive or to unnecessarily limit the scope of the invention. The preferred embodiment was chosen and described in order to explain the principles of the invention so that others skilled in the art may practice the invention. Having shown and described a preferred embodiment of the invention, those skilled in the art will realize that many variations and modifications may be made to affect the described invention. Many of those variations and modifications will provide the same result and fall within the spirit of the claimed invention.

The invention claimed is:

1. A cart comprising:
  a) a weighing tray comprising:
    i) a horizontal portion for supporting a load to be weighed;
    ii) parallel wall-like members vertically upstanding from opposite lateral edges of the horizontal portion;
    iii) projections fixedly connected to and extending outwardly from the wall-like members;
  b) a scale assembly substantially supporting the weighing tray, said scale assembly comprising:
    i) a base adapted for facing contact with the horizontal portion when the horizontal portion is in a lowered non-weight measuring position;
    ii) pneumatic piston-cylinder combinations, piston rods of the piston-cylinder combinations having first ends extending from the cylinders and being fixedly connected to the base, said piston-cylinder combinations lifting the weighing tray and any load resting thereon off the base for measurement of the weight of the load upon receipt of an actuating signal from an electronic controller associatively connected with the cart and lowering the tray and any load resting thereon to contact the base portion upon weighing the load;
    iii) shelf members fixedly connected to the piston-cylinder combinations;
  c) load cells connecting the shelf members and the projections; and
  d) an electronic controller connected to the cart, being in electrical communicative association with said load cells and having a visible output device for displaying weight of a container on said weighing tray.

2. The cart of claim 1 wherein the projections extend laterally from the wall-like members.

3. The cart of claim 1 wherein the projections are at upper vertical extremities of the wall-like members.

4. The cart of claim 2 wherein the projections are at upper vertical extremities of the wall-like members.

5. A cart for weighing a batch of granular plastic resin material in a container consisting of:
  a) a tray;
  b) a base;
  c) pneumatic piston-cylinder combinations, piston rods of the piston-cylinder combinations having first ends fixedly connected to the base, said piston-cylinder combinations lifting and lowering the tray and any load resting thereon from and to the base;
  d) load cells connected to the base and to the tray;
  e) an electronic controller in electrical communicative association with said load cells and having a visible output device for displaying weight of the contents of a container on said tray.

* * * * *